(12) United States Patent
Nath et al.

(10) Patent No.: US 10,228,283 B2
(45) Date of Patent: Mar. 12, 2019

(54) SPECTRAL IMAGING SYSTEM

(71) Applicant: SPECTRAL INSIGHTS PRIVATE LIMITED, Bangalore (IN)

(72) Inventors: Sumit Nath, Bangalore (IN); Dipankar Das, Bangalore (IN); Suhash Gerald, Bangalore (IN)

(73) Assignee: SPECTRAL INSIGHTS PRIVATE LIMITED, Bangalore (IN)

( * ) Notice: Subject to any disclaimer, the term of this patent is extended or adjusted under 35 U.S.C. 154(b) by 0 days.

(21) Appl. No.: 15/676,979

(22) Filed: Aug. 14, 2017

(65) Prior Publication Data

US 2018/0045569 A1    Feb. 15, 2018

Related U.S. Application Data

(63) Continuation of application No. PCT/IB2017/050862, filed on Feb. 16, 2017.

(30) Foreign Application Priority Data

Aug. 12, 2016 (IN) .............................. 201641027671

(51) Int. Cl.
 *G01J 3/02* (2006.01)
 *G01J 3/12* (2006.01)
 (Continued)

(52) U.S. Cl.
 CPC ........... *G01J 3/2823* (2013.01); *G01J 3/0208* (2013.01); *G01J 3/14* (2013.01); *G01J 3/36* (2013.01);
 (Continued)

(58) Field of Classification Search
 CPC ............................ G01J 3/36; G01J 2003/2826
 See application file for complete search history.

(56) References Cited

U.S. PATENT DOCUMENTS

| 5,377,003 A | * | 12/1994 | Lewis | ................... | G01J 3/2823 |
| | | | | | 250/339.02 |
| 5,900,942 A | * | 5/1999 | Spiering | ............... | G01J 3/2823 |
| | | | | | 348/188 |

(Continued)

FOREIGN PATENT DOCUMENTS

| CN | 102721469 A | 10/2012 |
| WO | PCT/CA2009/000122 A1 | 8/2009 |

OTHER PUBLICATIONS

Darren J. Batey, Daniel Claus, John M. Rodenburg, Information multiplexing in ptychography, Ultramicroscopy, date Publication Year2014, pp. 13-21, vol. 138, Elsevier B.V.

(Continued)

*Primary Examiner* — Shawn Decenzo
(74) *Attorney, Agent, or Firm* — IPHorizons PLLC; Narendra Reddy Thappeta

(57) ABSTRACT

A spectral imaging system includes a spectrometer and an optics imaging system. The spectrometer is operable for generating spectral signatures of objects from a scene. The optics imaging system is operable to generate six or more responses from the same scene. Each of the six or more responses represents different spectral content of the objects in the scene. The responses generated by the optics imaging system can be used to generate a hypercube using spectral reconstruction techniques. In an embodiment, the spectral imaging system could be implemented as part of a mobile phone.

20 Claims, 6 Drawing Sheets

(51) Int. Cl.
*G01J 3/14* (2006.01)
*G01J 3/28* (2006.01)
*G01J 3/36* (2006.01)
*G01J 3/45* (2006.01)
*G01J 3/453* (2006.01)

(52) U.S. Cl.
CPC .............. *G01J 3/45* (2013.01); *G01J 3/4531* (2013.01); *G01J 2003/1213* (2013.01); *G01J 2003/2826* (2013.01)

(56) References Cited

U.S. PATENT DOCUMENTS

| | | | |
|---|---|---|---|
| 6,717,668 B2* | 4/2004 | Treado | G01B 11/2545 356/300 |
| 6,822,742 B1* | 11/2004 | Kalayeh | G01N 21/31 250/338.1 |
| 7,026,626 B2* | 4/2006 | Harrison | G01J 3/2803 250/372 |
| 7,253,894 B2 | 8/2007 | Zeng et al. | |
| 7,283,232 B2 | 10/2007 | Brady et al. | |
| 7,728,845 B2 | 6/2010 | Holub | |
| 7,768,566 B2* | 8/2010 | Monroe | G02B 13/16 348/217.1 |
| 8,340,937 B2 | 12/2012 | Skinner et al. | |
| 8,558,182 B2 | 10/2013 | Chi et al. | |
| 8,611,660 B2 | 12/2013 | Finlayson et al. | |
| 9,228,897 B2* | 1/2016 | Sloan | G01J 3/28 |
| 9,319,636 B2 | 4/2016 | King | |
| 9,709,787 B2* | 7/2017 | Cooper | G02B 21/06 |
| 9,719,856 B2* | 8/2017 | Potter | G01J 3/2823 |
| 9,787,915 B2* | 10/2017 | Lebber | H04N 5/2353 |
| 10,088,364 B2* | 10/2018 | Sasada | G01J 3/462 |
| 2001/0052979 A1* | 12/2001 | Treado | G01B 11/2545 356/326 |
| 2005/0174573 A1* | 8/2005 | Harvey | G01J 3/2823 356/328 |
| 2005/0285966 A1* | 12/2005 | Bamji | G01C 3/08 348/336 |
| 2006/0274308 A1 | 12/2006 | Brady et al. | |
| 2010/0309454 A1 | 12/2010 | Zhang | |
| 2011/0216324 A1* | 9/2011 | Arieli | G01J 3/45 356/453 |
| 2011/0285995 A1* | 11/2011 | Tkaczyk | G01J 3/02 356/326 |
| 2012/0226480 A1* | 9/2012 | Berkner | G01J 1/0492 703/1 |
| 2012/0281223 A1 | 11/2012 | Mortimer | |
| 2013/0341509 A1* | 12/2013 | Nelson | G01J 3/0248 250/330 |
| 2014/0078379 A1* | 3/2014 | Masuda | H04N 9/045 348/360 |
| 2014/0152990 A1* | 6/2014 | Ehbets | G01J 3/50 356/405 |
| 2014/0378843 A1* | 12/2014 | Valdes | G02B 21/06 600/476 |
| 2015/0024968 A1* | 1/2015 | Rulison | G01N 21/6428 506/12 |
| 2016/0003675 A1* | 1/2016 | Abolbashari | G02B 27/0075 356/326 |
| 2016/0069743 A1* | 3/2016 | McQuilkin | G01J 3/2803 356/416 |
| 2016/0123810 A1* | 5/2016 | Ando | G01J 3/14 356/326 |
| 2016/0187199 A1* | 6/2016 | Brunk | G01J 3/2823 348/89 |
| 2016/0249810 A1* | 9/2016 | Darty | A61B 5/0075 600/477 |
| 2016/0345820 A1* | 12/2016 | Frisken | A61B 3/0025 |
| 2017/0058343 A1* | 3/2017 | Quintel | G01J 3/513 |
| 2017/0074652 A1* | 3/2017 | Send | G01C 3/08 |
| 2017/0176338 A1* | 6/2017 | Wu | G06T 7/90 |
| 2017/0205337 A1* | 7/2017 | Akhtman | G01J 3/2823 |
| 2017/0272709 A1* | 9/2017 | Hagiwara | G02B 5/201 |
| 2017/0367583 A1* | 12/2017 | Black | A61B 5/00 |
| 2018/0017501 A1* | 1/2018 | Trenholm | G01N 21/88 |

OTHER PUBLICATIONS

Written Opinion of the International Searching Authority, Co-pending PCT International application No. PCT/IB2017/050862 (filing date:Feb. 16, 2017), dated May 19, 2017, pp. 1-6.
ISR Search Report, Co-pending PCT International application No. PCT/IB2017/050862 (filing date: Feb. 16, 2017), dated May 19, 2017, pp. 1-3.
Eoung Wug Oh, Michael S. Brown, Marc Pollefeys, Seon Joo Kim, Do It Yourself Hyperspectral Imaging With Everyday Digital Cameras, The IEEE Conference on Computer Vision and Pattern Recognition (CVPR), 2016, pp. 2461-2469.
Rueda H, Lau D, Arce GR., Multi-spectral compressive snapshot imaging using RGB image sensors, published Apr. 30, 2015, pp. 1-15, vol. 23, No. 9, Opt Express.
Michele Moscaritolo, Alessandro Della Villa, Giacomo Benelli, Real Time Dual Camera Spectral Imaging Based on Nvidia Tegra Soc to Assess UAV Missions, date Apr. 7, 2016, pp. 1-27.
Delauré, B.; Michiels, B.; Biesemans, J.; Livens, S.; Van Achteren, T.,The Geospectral Camera: a Compact and Geometrically Precise Hyperspectral and High Spatial Resolution Imager, ISPRS—International Archives of the Photogrammetry, Remote Sensing and Spatial Information Sciences, vol. XL-1/W1, ISPRS Hannover Workshop 2013, May 21-24, 2013, pp. 69-74.
Osiris: Optical, Spectroscopic, and Infrared Remote Imaging System, downloaded circa Jul. 20, 2016, pp. 1-5.
Holcomb MR1, Woods MC, Uzelac I, Wikswo JP, Gilligan JM, Sidorov VY., The potential of dual camera systems for multimodal imaging of cardiac electrophysiology and metabolism, https://www.ncbi.nlm.nih.gov/pubmed/19657065, downloaded circa Jul. 20, 2016, pp. 1-2.
Heikkinen, Ville, Kernel methods for estimation and classification of data from spectral imaging, Publications of the University of Eastern Finland. Dissertations in Forestry and Natural Sciences., No. 31, date 2011, pp. 1-118.
Antonino Cosentino, Multispectral imaging system using 12 interference filters for mapping pigments, Available from: Antonino Cosentino, Retrieved on: May 1, 2016, pp. 1-15.
Yonghuizhao, and Roy S. Zhao, Bernsberns, Image Image-based spectral reflectance reconstruction using the matrix R method, Color research arid applicationColor applicationvol. 32, No. 5, 2007 vol. 2007, date Aug. 20, 2007, pp. 1-26.
Hugh S. Fairman, Michael H. Brill, The Principal Components of Reflectances, COLOR research and application, date Apr. 2004, pp. 104-110.
Guowei Hong, M. Bonnier Luo, Peter A. Rhodes, A study of digital camera colorimetric characterization based on polynomial modeling, COLOR research and application, date Feb. 2001, pp. 76-84, vol. 26, Issue 1.
S. Peyvandi ; S. H. Amirshahi ; J. Hernandez-Andres ; J. L. Nieves ; J. Romero, Generalized Inverse-Approach Model for Spectral-Signal Recovery, IEEE Transactions on Image Processing ( vol. 22, Issue: 2, Feb. 2013 ), date of Publication: Sep. 13, 2012, pp. 501-510, IEEE.
Heikkinen, Ville; Jetsu, Tuija; Parkkinen, Jussi; Hauta-Kasari, Markku; Jaaskelainen, Timo; Lee, Seong Deok, Regularized learning framework in the estimation of reflectance spectra from camera responses, Journal of the Optical Society of America A, vol. 24, issue 9, , Publication Date:Sep. 2007, pp. 2673-2682.
Zhang X, Xu H, Reconstructing spectral reflectance by dividing spectral space and extending the principal components in principal component analysis, date Feb. 2006, pp. 371-378, vol. 25, No. 2.
Heikkinen Vl, Lenz R, Jetsu T, Parkkinen J, Hauta-Kasari M, Jääskeläinen T, Evaluation and unification of some methods for estimating reflectance spectra from RGB images, date Oct. 2008, pp. 2444-2458, vol. 25, No. 10.
Ville Heikkinen, Arash Mirhashemi, and Juha Alho, Link functions and Matérn kernel in the estimation of reflectance spectra from RGB

(56) References Cited

OTHER PUBLICATIONS responses, Journal of the Optical Society of America A, date Nov. 2013, pp. 2444-2454, vol. 30, Issue 11.
Eckhard T, Valero EM, Hernández-Andrés J, Heikkinen V., Evaluating logarithmic kernel for spectral reflectance estimation-effects on model parametrization, training set size, and number of sensor spectral channels, Optical Society of America, date Mar. 2014, pp. 541-549, vol. 31, No. 3.
Heikkinen V, Cámara C, Hirvonen T, Penttinen N, Spectral imaging using consumer-level devices and kernel-based regression, Journal of the Optical Society of America A, date May 13, 2016, pp. 1095-1110, vol. 33, No. 6.
22. Farnaz Agahian, Seyed Ali Amirshahi, Seyed Hossein Amirshahi, Reconstruction of reflectance spectra using weighted principal component analysis, Available from: Farnaz Agahian Retrieved on: Apr. 19, 2016, date Oct. 2008, pp. 360-371, vol. 33, Issue 5.
Aghanouri, Abolfazl; Amirshahi, Seyed; Agahian, Farnaz, Reconstruction of Spectral Transmission of Colored Solutions Using a Conventional Digital Camera, Journal of Imaging Science and Technology, Jan. 2010, pp. 10508-1-10508-8(8), vol. 54, No. 1, Society for Imaging Science and Technology.
Murakami Y1, Obi T, Yamaguchi M, Ohyama N, Nonlinear estimation of spectral reflectance based on Gaussian mixture distribution for color image reproduction, Applied Optics, date Aug. 10, 2002, pp. 1-8, vol. 41, No. 23.
Jeffrey M, Dicarlo and Brian A. Wandell, Spectral estimation theory: beyond linear but before Bayesian, Journal of the Optical Society of America A, date Jul. 2003, pp. 1261-1270, vol. 20, Issue 7.
Yusuke Monno; Masayuki Tanaka; Masatoshi Okutomi, Direct spatio-spectral datacube reconstruction from raw data using a spatially adaptive spatio-spectral basis, Proceedings vol. 8660, Digital Photography IX; 866003 (2013); doi: 10.1117/12.2002292, Event: IS&T/SPIE Electronic Imaging, 2013, Burlingame, California, United States, date Feb. 4, 2013, pp. 1-8.
Seyed Hossein Amirshahiemail Authorseyed Ali Amirhahi, Adaptive non-negative bases for reconstruction of spectral data from colorimetric information, Optical Review, date Nov. 2010, pp. 562-569, vol. 17, Issue 6.
Shahram Peyvandi, Seyed Hossein Amirshahi, Javier Hernández-Andrés, Juan Luis Nieves, and Javier Romero, Spectral recovery of outdoor illumination by an extension of the Bayesian inverse approach to the Gaussian mixture model, Journal of the Optical Society of America A, date Oct. 2012, pp. 2181-2189, vol. 29, Issue 10.
Antony Lam, Art Subpa-Asa, Imari Sato, Takahiro Okabe, Yoichi Sato, Spectral Imaging Using Basis Lights, In Proceedings British Machine Vision Conference 2013, pp. 41.1-41.11.
Achuta Kadambi ; Ayush Bhandari ; Refael Whyte ; Adrian Dorrington ; Ramesh Raskar, Demultiplexing illumination via low cost sensing and nanosecond coding, Computational Photography (ICCP), 2014 IEEE International Conference on May 2-4, 2014, pp. 1-10, IEEE, Santa Clara, CA, USA.
Adolf W. Lohmann, Gerd Weigelt, and Bernhard Wirnitzer, Speckle masking in astronomy: triple correlation theory and applications, Applied Optics, date Dec. 15, 1983, pp. 4028-4037, vol. 22, Issue 24.
Henry Arguello ; Gonzalo R. Arce, Rank Minimization Code Aperture Design for Spectrally Selective Compressive Imaging, IEEE Transactions on Image Processing, Date of Publication: Oct. 5, 2012, pp. 941-954, vol. 22, Issue: 3.
Gordon Wetzstein, Computational Plenoptic Image Acquisition and Display, date Sep. 2011, pp. 1-250.
Gordon Wetzstein, Ivo Ihrke and Wolfgang Heidrich, On Plenoptic Multiplexing and Reconstruction, International Journal on Computer Vision (IJCV 2012), to appear IEEE Conference on Computer Vision and Pattern Recognition (CVPR 2010) oral, pp. 1-8.
Fourier Slice Photography, In ACM Transactions on Graphics, Jul. 2005 (Proceedings of SIGGRAPH), downloaded circa Apr. 3, 2016, pp. 1-10.
Herrera-Ramírez J, Vilaseca M, Pujol J., Portable multispectral imaging system based on light-emitting diodes for spectral recovery from 370 to 1630 nm, date May 9, 2014, pp. 3131-3141, vol. 53, No. 14.
Raju Shrestha and Jon Yngve Hardeberg, Multispectral imaging using LED illumination and an RGB camera, date 2013, pp. 1-6.
Gordon Wetzstein, Ivo Ihrke, Wolfgang Heidrich, On Plenoptic Multiplexing and Reconstruction, International Journal of Computer Vision Jan. 2013, date Oct. 23, 2012, pp. 384-400, vol. 101, Issue 2.
Gordon Wetzstein, Ivo Ihrke, Wolfgang Heidrich, An Analysis of Spatial- and Fourier-Multiplexed Imaging, download circa Mar. 29, 2016, pp. 1-11.
Gordon Wetzstein, Ivo Ihrke, Douglas Lanman, Wolfgang Heidrich, Computational Plenoptic Imaging, Computer Graphics Forum (Sep. 2011), date Oct. 31, 2011, pp. 1-25, vol. xx (200y), No. z.
Xiaoze OU, Guoan Zheng, and Changhuei Yang, Embedded pupil function recovery for Fourier ptychographic microscopy, Optical Society of America, date Feb. 24, 2014, pp. 4960-4972, vol. 22, Issue 5.
Colour and physics: Some remarks concerning the physical aspects of human colour vision, downloaded circa Mar. 16, 2016, pp. 1-58.
Ron Zass, Amnon Shashua, Nonnegative Sparse PCA, Advances in Neural Information Processing Systems 19 (NIPS 2006), downloaded circa Mar. 12, 2016, pp. 1-7.
Shuai Hanemail Authorimari Satotakahiro Okabeyoichi Sato, Fast Spectral Reflectance Recovery Using DLP Projector, International Journal of Computer Vision, date Dec. 13, 2013, pp. 172-184, vol. 110, Issue 2.
J. P. S. Farkkinen, J. Hallikainen, and T. Jaaskelainen, Characteristic spectra of Munsell colors, Journal of the Optical Society of America A, date Feb. 1989, pp. 318-322, vol. 6, Issue 2.
Jong-Il Park, Moon-Hyun Lee, Michael D. Grossberg, Shree K. Nayar, Multispectral Imaging Using Multiplexed Illumination, IEEE International Conference on Computer Vision (ICCV), Oct. 2007, pp. 1-8.
Dannemiller JL, Computational approaches to color constancy: adaptive and ontogenetic considerations, date 1989, pp. 255-266, vol. 96, No. 2.
David H. Marimont and Brian A. Wandell, Linear models of surface and illuminant spectra, Journal of the Optical Society of America A, date 1992, pp. 1905-1913, vol. 9, Issue 1.
Laurence T. Maloney and Brian A. Wandell, Color constancy: a method for recovering surface spectral reflectance, Journal of the Optical Society of America A, date 1986, pp. 29-33, vol. 3, Issue 1.
Jun Jiang and Jinwei GU, Recovering Spectral Reflectance under Commonly Available Lighting Conditions, downloaded circa Mar. 2, 2016, pp. 1-8.
Y. Zhao and R. S. Berns "Image based spectral reflectance reconstruction using the matrix R method," published in Color Research & Application, v. 32, pp. 343-351, 2007.
F. Agahian et al "Reconstruction of reflectance spectra using weighted principal component analysis", published in Color Research & Application, v 33(5), pp. 360-371, 2008.
J.M. Dicarlo and B.Wandell "Spectral estimation theory; beyond linear but before Bayesian", published in J. Opt. Soc. Am—A, v.20(7), pp. 1261-1270, 2003.
V. Heikkinen et al "Link functions and Matern kernel in the estimation of reflectance spectra from RGB responses", published in J. Opt. Soc. Am—A, v. 30(11), pp. 2444-2454, 2013.
Eva M. Valero, Juan L. Nieves, Sérgio M C Nascimento, Kinjiro Amano,David H. Foster, Recovering spectral data from natural scenes with an RGB digital camera and colored filters, Color Research and Application, date Oct. 2007, pp. 352-360, vol. 32, No. 5, Wiley Periodicals, Inc.

* cited by examiner

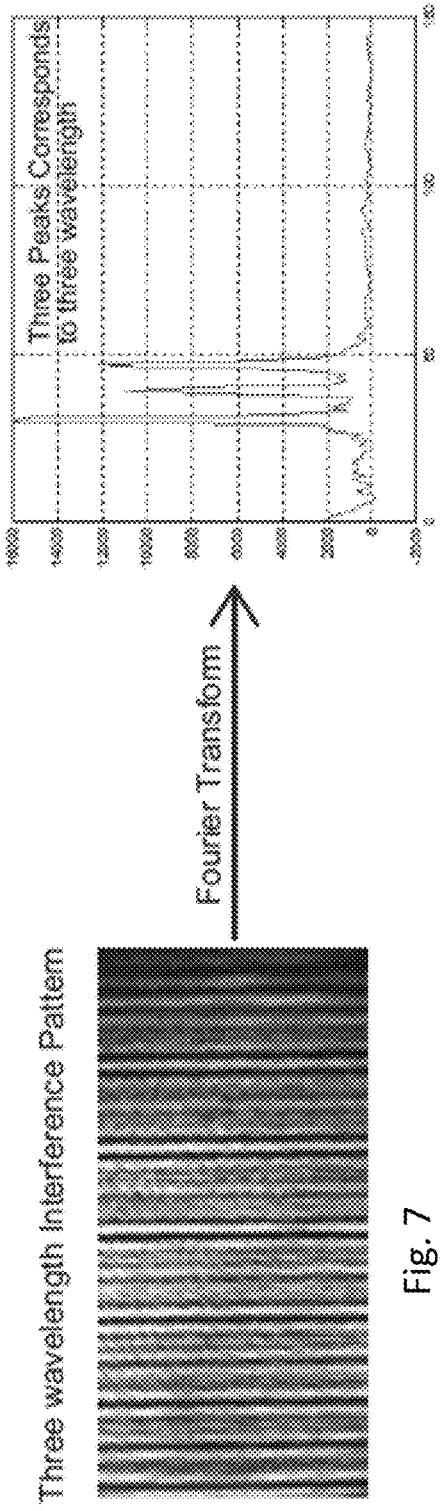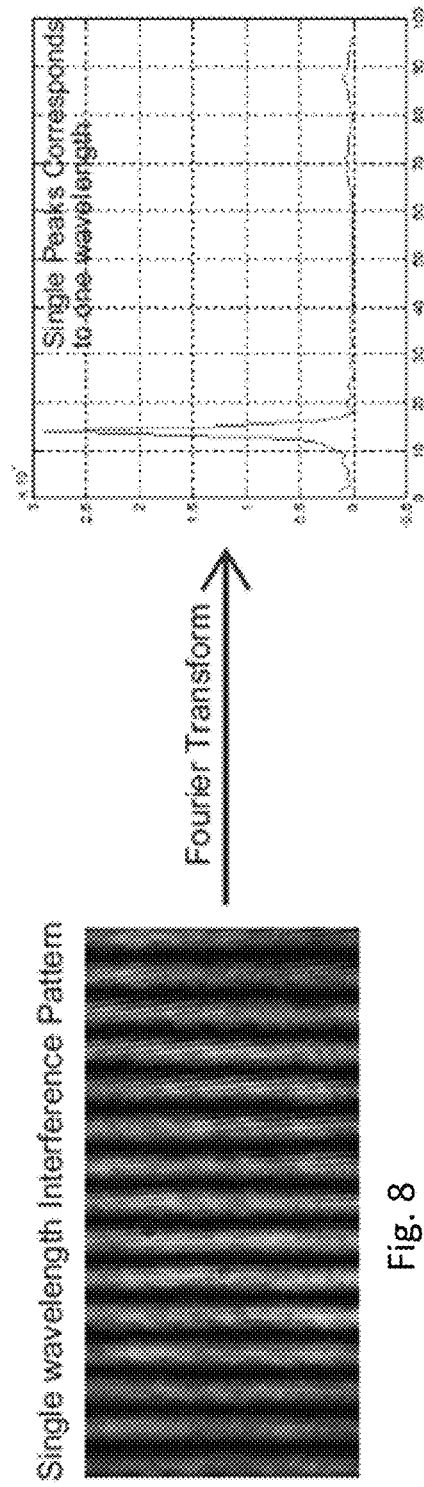

SPECTRAL IMAGING SYSTEM

PRIORITY CLAIMS

The instant patent application is related to and claims priority from the below co-pending applications, which are incorporated in their entirety into the present application herewith:

A. India Provisional Patent Application No. 201641027671, entitled "Spectral Imaging Equipment", filed 12 Aug. 2016, and naming as Applicant "Spectral Insights";

B. PCT application No. PCT/IB2017/050862, entitled "Spectral Imaging System", filed 16 Feb. 2017, and naming as Applicant "Spectral Insights Private Limited".

BACKGROUND

Technical Field

Embodiments of the present disclosure relate generally to spectral imaging systems.

Related Art

Spectral imaging is well known in the relevant arts, and generally refers to the collection and processing of spectral information pertaining to scenes of interest. The goal of such processing may be to obtain the spectral response of objects in the scene, with the purpose of identifying objects/materials, defects, etc. Embodiments of the present invention are directed to spectral imaging systems.

BRIEF DESCRIPTION OF THE VIEWS OF DRAWINGS

Example embodiments of the present disclosure will be described with reference to the accompanying drawings briefly described below.

FIG. 7 is a snapshot of an interference pattern formed by three wavelengths as captured by an interferometer in an embodiment of the present invention.

FIG. 8 is a snapshot of an interference pattern formed by a single wavelength as captured by an interferometer in an embodiment of the present invention.

FIG. 9 is the Fourier transform of the interference pattern of FIG. 7.

FIG. 10 is the Fourier transform of the interference pattern of FIG. 8.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
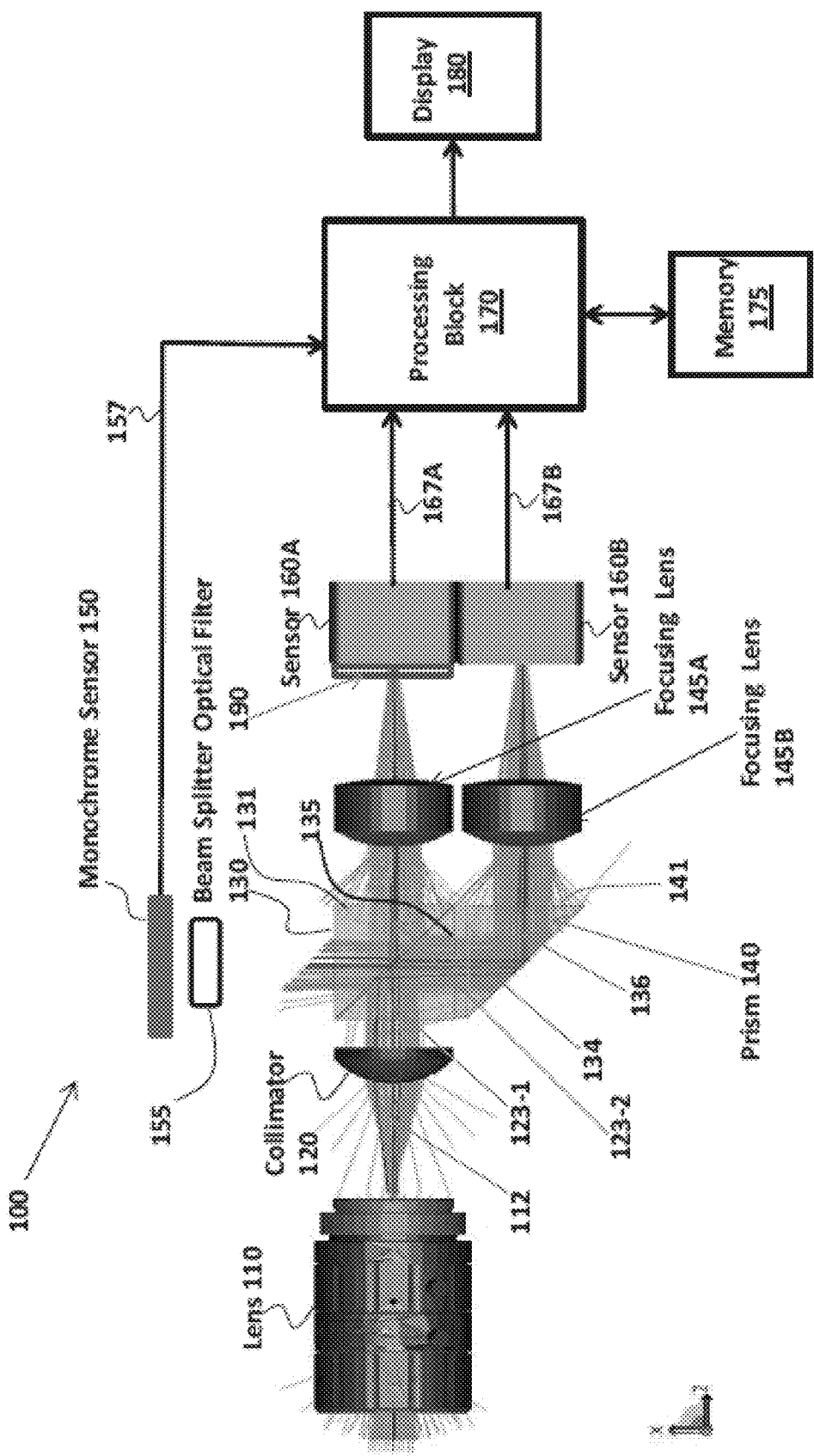
FIG. 1 is a block diagram of a spectral imaging system in an embodiment of the present disclosure.

A spectral imaging system provided according to an aspect of the present disclosure contains an interferometer and an optics sub-system. The interferometer is designed to generate an interference pattern from a first light beam emanating from a first scene. The optics sub-system is designed to generate six or more responses from a second light beam formed by a single illumination of a second scene, with each response is a corresponding image of the second scene represented by different spectral content of the second light beam.

According to another aspect of the present disclosure, the spectral imaging system contains a processing block to process an interference pattern to generate a spectral signature of the first scene such that said spectral imaging system operates as a spectrometer. The processing block may also process the responses to generate a hypercube by spectral reconstruction based on the responses. The hypercube contains multiple values for each pixel of an image representing the second scene, with each value representing the magnitude of reflectance of the portion of the second scene corresponding to the pixel at a corresponding wavelength contained in the single illumination. Accordingly the spectral imaging system operates as a spectral camera also.

Due to such integration of the spectrometer and the spectral camera function into a single unit, one or more of the benefits such as portable solutions, reduced compute complexity and cost savings may be realized.

In an embodiment, the spectral imaging system contains a filter to alter the intensity of one or more wavelengths from the second light beam, and a set of sensors to generate six responses from the filtered beam and the unfiltered beam of light. The set of sensors may be implemented in the form of a first sensor and a second sensor, with each sensor being implemented as a RGB (red, green and blue) sensor. Each sensor may accordingly generate three signal streams, with the first, second and third signal streams respectively representing only red, green, and blue colors.

According to another aspect of the present disclosure, the optics sub-system and interferometer are implemented with at least one common optics (synonymous with optical) component (which performs functions such as absorb, filter, reflect, refract, disperse, etc., of a light signal). In an embodiment, the spectral imaging system accordingly contains a beam splitter and a prism for simultaneous or independent operation as a spectrometer and a spectral camera. In the operation as a spectral camera, the combination of the beam splitter and the prism generates two parallel beams of lights from the same beam emanating from a scene. When used as a spectrometer, the combination also operates to reflect at least some light from two parallel beams with different phases onto a monochrome sensor. As a result, interference of the two incident parallel beams (with phase delay) is obtained and recorded by the monochrome sensor before being passed for further processing to the processing block.

According to another aspect, the spectral imaging system contains a memory to store the spectral signature as representing a base characteristic of an object representing said first scene. The base characteristic may be generated from a Fast Fourier Transform (FFT) of the interference pattern.

The processing block compares the spectral signature to characteristics represented by the values of the hypercube to determine whether the second scene deviates from the base characteristic.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Spectral Imaging System

FIG. 1 is a block diagram of a spectral imaging system in an embodiment of the present invention. Spectral imaging system 100 is shown containing various component blocks, which together operate as both a spectral camera and a spectrometer. Specifically, the spectral camera is described as being implemented based on an optics sub-system in combination with processing block 170, while the spectrometer is described as being implemented based on an interferometer in combination with processing block 170.

Figure 2A:
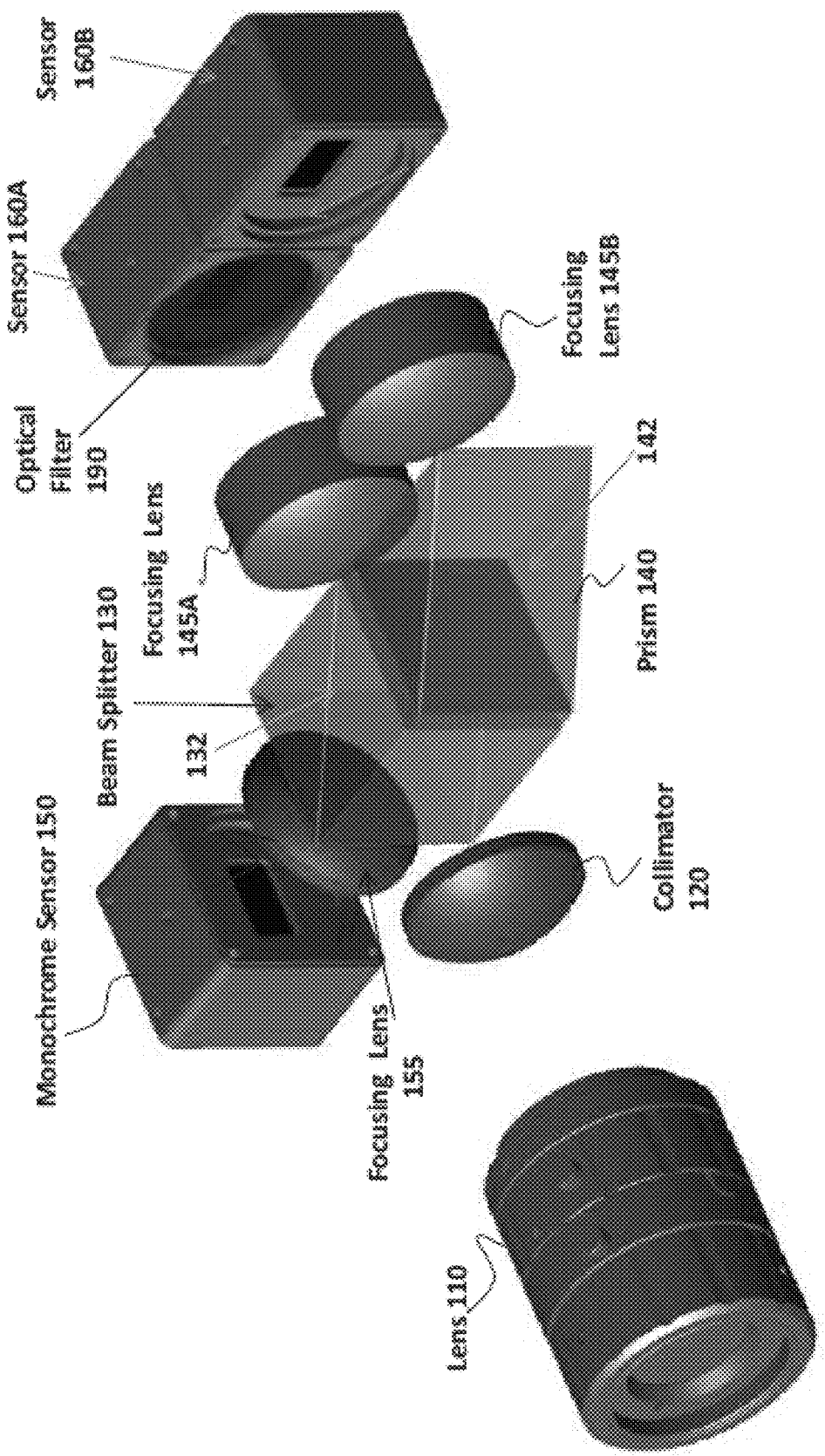
FIGS. 2A, 2B and 2C are block diagrams of some sub-systems of a spectral imaging system, in different embodiments of the present disclosure.
Figure 2B:
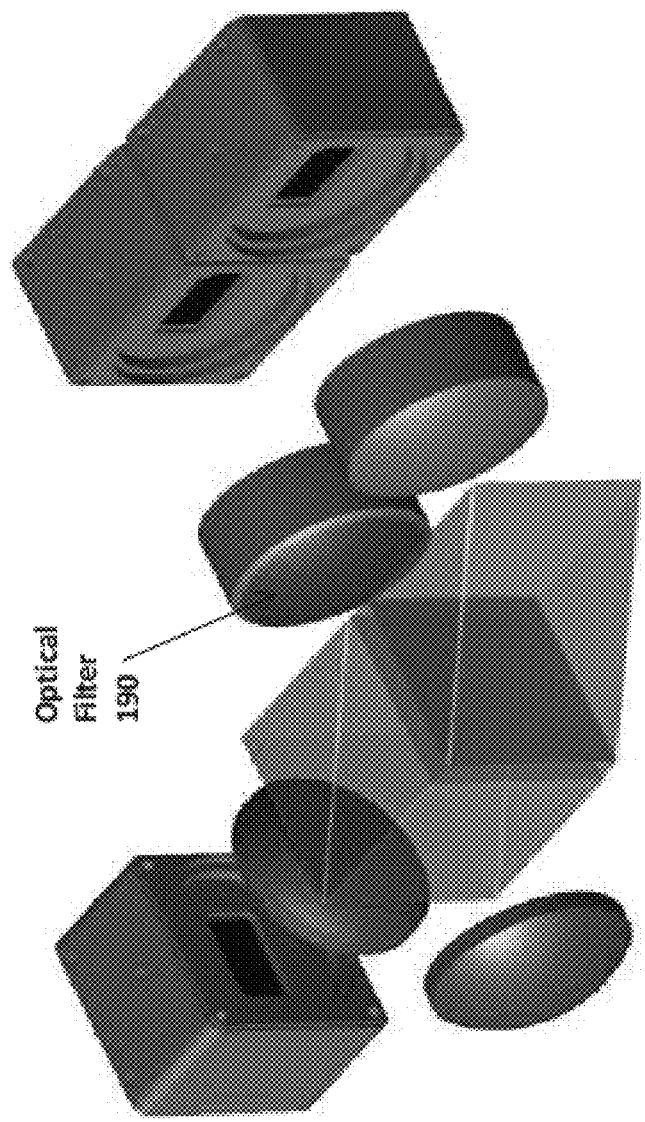
Figure 2C:
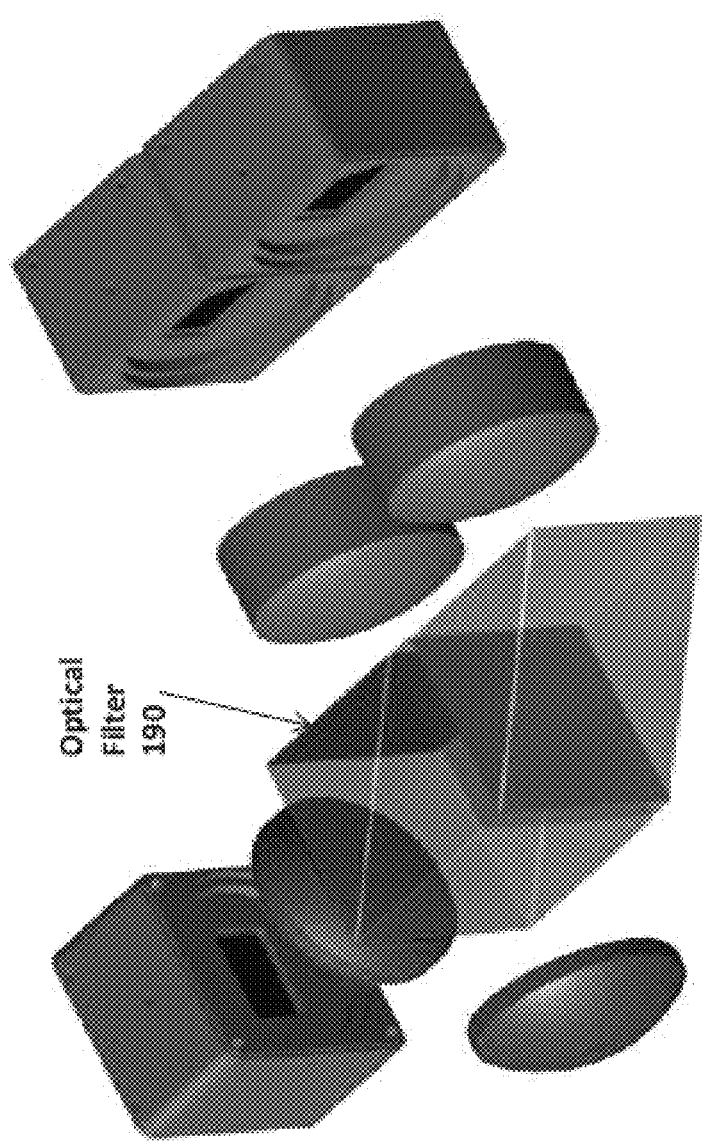

The optics sub-system is realized by the combination of lens 110, collimator 120, beam splitter 130, prism 140, focusing lenses 145A and 145B, sensors 160A and 160B, and optical filter 190 (shown indifferent configurations in FIG. 2A, FIG. 2B and FIG. 2C). As described in sections below, the optics sub-system generates six responses from a single illumination of a scene, with each response representing the same scene in corresponding different set of wavelengths (and thus differing in spectral content). However, alternative embodiments of the optics sub-system can be implemented with different structures and/or to generate more responses, as suited in the corresponding environment, as will be apparent to one skilled in the relevant arts by reading the disclosure provided herein.

The interferometer is realized by the combination of lens 110, collimator 120, beam splitter 130, prism 140, monochrome sensor 150, and focusing lens 155. As will be clear from the description below, the optical components operate to split a source wave (light beam) into two waves having slightly different phases but in the general same direction, causing the two waves to form an interference pattern.

It may also be appreciated that there are several optics components (beam splitter 130, prism 140, lens 110 and collimator 120) common to the implementation of the optics sub-system and the interferometer. An optics component generally alters the incident light beam in terms of characteristics such as direction (focusing), intensity, spectral content, etc.

As described in sections below, the spectrometer operation is based on the principle of a modified Michelson interferometer. An interference pattern is generated by two light beams having different phases (as the light beams travel different distances/path lengths), but derived from the same scene. However, alternative embodiments of the Michelson interferometer also can be implemented and/or with different structures, as will be apparent to one skilled in the relevant arts by reading the disclosure provided herein.

Processing block 170 processes the responses (with different spectral content) and generates a hyper-cube containing multiple values for each pixel of the scene, with each pixel value representing the magnitude of reflectance of the portion of the scene at corresponding to the pixel at a corresponding wavelength contained in the illumination.

Thus, assuming the scene is represented by 300×100 pixels (i.e., 30,000 pixels), and the illumination can be represented by 400 discrete wavelength values (which determines the system resolution), then the hyper-cube contains 300×100×400 values, or 400 slices or 'images' (one corresponding to each of the 400 wavelengths), each with 300×100 pixels. By generating such values, the spectral imaging system operates as a spectral camera.

Processing block 170 processes the interference pattern received from the interferometer and computes the spectral signature of the objects presents in the corresponding scene. The spectral signature represents the magnitude of reflectance of the objects in the scene at various wavelengths, and the spectral imaging system accordingly operates as a spectrometer as well.

In one embodiment described below, the scenes processed by the spectrometer are typically homogeneous portions of a known object which is fairly isotropic in terms of spectral signature, thereby representing a base characteristic of the object. Each scene thereafter processed by the spectral camera represents a sample object, whose characteristics are sought to be examined for deviation or similarity with the base characteristic. The description is continued with respect to the optics subsystem noted above.

3. Optics Subsystem

Referring to FIG. 1, light (second light beam) reflected or scattered from objects in the field of view (FoV) of lens 110 impinges on lens 110 (from the left) is focused by lens 110 to its focal plane, and thus forms a focused beam 112. The spectral content of the light impinging on lens 110 may be dependent on the object present in the scene, and can include visible light, infrared light, etc., depending on the illumination and the optical property of the objects. Collimator 120 narrows focused beam 112 emanating from lens 110 into a parallel beam 123-1. Spectral imaging system 100 may be implemented to operate function with a broadband illumination source, such as sunlight or a set of multi-wavelength LEDs (Light Emitting Diode), not shown in the Figures.

Beam splitter 130 splits the parallel beam 123-1 from collimator 120 into two beams. One beam continues straight through diagonal vertical plane 132 (shown in FIG. 2A) as beam 123-2, and impinges on focusing lens 145A. A second beam is formed by a 45° reflection and splitting of beam 123-1 by diagonal vertical plane 132 (shown in FIG. 2A) of beam splitter 130. The reflected beam 134 undergoes a total internal reflection (TIR) at the reflecting surface 142 of prism 140 and impinges on focusing lens 145B as beam 136. Although shown separately, the combination of beam splitter 130 and prism 140 can be implemented as a single optical component. The single component resembles a split trapezoid, and can be referred to as a Spzoid.

The two beams, one beam deflected twice (at plane 132 and 142) and the other (which passes straight through the beam splitter 130), are focused by lens 145B and 145A respectively to impinge on respective CMOS sensors 160A and 160B. The two beams have identical spectral content since they are derived/obtained from a same source beam (123-1) without any filtering. The use of focusing lenses 145A and 145B is optional, and may be meant for factory calibration purposes only.

Each of sensors 160A and 160B generates electrical signals (for example charge, which may be converted to a voltage internally in the sensor itself) representing the intensity of light impinging on the corresponding sensor (beam 123-2 on sensor 160A, and beam 136 on sensor 160B). The two sensors 160A and 160B can be operated such that they simultaneously capture the same view of the object/scene as seen by the lens 110. In an embodiment, sensors 160A and 160B are each implemented as an RGB sensor having Bayer pattern, have identical characteristics and therefore may be selected from the same manufacturing batch/lot.

As is well known, Bayer color filter array is a popular format for digital acquisition of color images, and follows a GRGR, BGBG, GRGR, BGBG pattern, as is also well known. Each of sensors 160A and 160B is covered with either a red, a green, or a blue filter, in a periodic pattern as noted above, and generates three streams of output voltages (or charge) (which can be rendered as three separate monochrome images after processing) corresponding to the red (R), green (G) and blue (B) components of the light that impinges on the corresponding sensor.

The RGB streams formed at the output of sensor 160A are deliberately designed to be different from RGB stream formed at the output of sensor 160B for the same scene/object. Such a difference can be obtained, for example, by placing a filter in the path of light beam 123-2. This will cause the corresponding light beam (impinging on sensor 160A) to have a spectral content different from light beam 136 impinging on sensor 160B, as the filter effectively removes or alters the intensity of one or more wavelengths from the beam of light impinging on it. Thus, it may be appreciated that sensor 160A generates three images, one corresponding to R, a second corresponding to G, and a third corresponding to B. Sensor 16B generates another three images, one corresponding to R' (R modified by the filter), a second corresponding to B' (B modified by the filter), and a third corresponding to B' (B modified by the filter). Each of the six images represents a same view of the object/scene (second scene) as seen by the lens 110, but each image has different spectral content (i.e., each image represents the second scene in a correspondingly different (non-identical) band of wavelengths). Further, the six images (or responses) are obtained by a single illumination of the object/scene (second scene).

In one embodiment of the present invention, such difference is obtained by placing an optical filter 190 (not shown in FIG. 1, but shown in FIGS. 2A, 2B and 2C) in the path of the beam of light impinging on sensor 160A (while sensor 160B has no such optical filter).

Three different placements/locations of optical filter 190 are shown in FIGS. 2A, 2B and 2C respectively. In FIG. 2A, optical filter 190 is coated on the protecting glass in front of sensor 160A itself. In FIG. 2B, optical filter 190 is coated on focusing lens 145A, while in FIG. 2C, optical filter 190 is shown coated on a surface of beam splitter 130. The design of optical filter 190 may require that optical filter 190 be spatially homogeneous, i.e., optical filter 190 should distort the light in the exact same way at all pixels of sensor 160A. Optical filter 190 may be customized for a particular application. For example, optical filter 190 may be realized using spray painting, or be a uniformly-coated filter on a glass surface in any form as shown in FIGS. 2A, 2B and 2C.

It is to be understood that other techniques can instead be used to achieve different spectral responses for the two beams of lights impinging on sensors 160A and 160B respectively. Thus, in an alternative embodiment of the present disclosure for example, one of the sensors 160A/160B is implemented as a 'high-quality' sensor while the other is implemented as a relatively 'low quality' sensor in terms of their spectral response. The distortion introduced by the low-quality sensor performs the function of optical filter 190, and thus in such an embodiment, the requirement of optical filter 190 is dispensed with.

In the two embodiments noted above, therefore, each of paths 167A and 167B represents logically three separate paths, one each for the three components (which can be rendered as corresponding images) corresponding to R, G and B components. However, due to the spectral distortion introduced by filter 190, or due to use of one high quality sensor and another low quality sensor, the outputs of one (say color sensor 160A) may be inferred as R, G and B signals/images, while the outputs of the other may be viewed as to R', G' and B' signals/images.

In yet another embodiment, instead of two separate sensors (160A and 160B), a single large RGB color sensor (for example, 12 megapixels) can be used. 50% of the 'sensing area' of such a single sensor is covered by a filter (similar to optical filter 190) while the other 50% is not. The outputs corresponding to pixels in one half may be viewed as R, G and B signals/images, while the outputs corresponding to the other half may be viewed as R', G' and B' signals/images.

Thus, the optics sub-system of the spectral camera generates six responses (simultaneously) from a single light beam emanating from a scene.

Although noted above as RGB color sensors, sensors 160A and 160B can also be built to have specific filters such as A, B, C, D (instead of a standard Bayer pattern), with A, B, C and D representing corresponding desired colors (or wavelengths or wavelength bands). Thus, for example, it is possible for one sensor (e.g., 160A) to produce 5 responses (or channels) and the other sensor (e.g., 160B) to produce the $6^{th}$ response/channel. Further, depending on the specific design of the sensors (e.g., by using corresponding numbers and/or type of filters), more than six responses can also be obtained from the optics sub-system, as will be apparent to one skilled in the relevant arts.

Processing block 170 receives the responses on paths 167A and 167B (in the embodiments in which two separate sensors are employed) or the output of a single sensor (as noted above). Alternatively, the responses on paths 167A and 167B can be recorded suitably and transmitted (using circuits/sub-systems not shown) to external devices and systems, which may then be used to perform operations such as generating the hypercube, identification of objects in the scene, etc., as noted herein.

It may be appreciated from the description above that the combination of beam splitter 130 and prism 140 allows true snapshot imaging by generating six or more responses of the same scene from a single 'snapshot', without having to change illuminations or filters, and may also mitigate misregistration artifacts.

Some variants/alternative implementations of some of the optical sub-systems of the spectral camera are now noted. In another embodiment of the present invention, spectral imaging system 100 does not contain prism 140. In such an embodiment, sensor 160B is positioned to receive the ninety-degree reflected light beam from beam splitter 130, i.e., sensor 160B is at right angles to sensor 160A, and the beam impinging on sensor 160A is orthogonal to the beam impinging on sensor 160B. However, such an arrangement may lead to unregistered images, and require registration to be performed. Accordingly computational load on processing block 170 would be correspondingly higher. In comparison to such an embodiment, embodiments in which prism 140 is used (as in FIG. 1), the images acquired by sensors 160A and 160B are perfectly aligned and registered. Therefore, computational load on processing block 170 would be correspondingly lower.

The description is continued with respect to the interferometer noted above.

4. Interferometer

Beams of light (first beam) originating from a known object/scene (when placed in FoV of lens 110) are back-reflected from partially reflecting surfaces of beam-splitter 130 and prism 140. The back-reflected beams of light can be used to create interference patterns, and a modified Michelson-class interferometer is utilized for this purpose. Different combinations of reflected beams can be chosen to create interference from the partial reflection by applying reflective coating on the available from surfaces 131, 135 and 141. One could choose reflection from 131 and 135, or 131 and 141, or 135 and 141, to generate an interference pattern. Once a particular surface combination pair is chosen we apply partially reflective coating on these surfaces (e.g., 131 and 141), the third surface (e.g., 135) would be given anti-reflection coating so that no reflection takes place from the third surface. Referring to FIG. 1, light, reflecting off known objects/scene in the field of view (FoV) of lens 110 generates beams 123-2 and 136 as noted above with respect to operation as a spectral camera.

Surfaces 131 and 135 of beam splitter 130 may be designed to reflect some portion of respective beams 123-2 and 134. The two reflected beams are termed as back reflections. The reflected portion of beam 134 travels towards focusing lens 155. The reflected portion of beam 123-2 is further reflected by diagonal vertical plane 132 and also travels towards focusing lens 155. The two reflected beams interfere due to unequal path differences delays (phase shifts), and the interference pattern is focused on monochrome sensor 150 by focusing lens 155. Monochrome sensor 150 provides electrical signals representative of the interference pattern on path 157.

Processing block 170 receives the electrical signal representing the interference pattern via path 157, and processes the interference pattern to obtain spectral signature of the known object/scene (when placed in FoV of lens 110), thereby enabling spectral imaging system 100 to operate as a spectrometer, as described next. However, it is to be understood that data representing the interference pattern captured by monochrome sensor 150 (for example, such as that would be provided on path 157) can instead be stored and transmitted to an external processing device for further processing.

5. Spectrometer

Processing block 170 receives, on path 157, signals (e.g., charge/voltage) representing an interference pattern (formed by light beams as noted above with respect to Interferometer) captured by the monochrome sensor 150, and computes the Fourier transform of the interference pattern to obtain the spectral signature of the known object/scene. FIG. 7 and FIG. 8 represent the interference pattern captured by the monochrome sensor 150, caused by the two beams reflected respectively from surfaces 131 and 135. Two example interference patterns are shown in FIG. 7 and FIG. 8 respectively. FIG. 7 corresponds to an interference pattern where the object/scene illuminated with a mixture of three monochromatic wavelengths. FIG. 8 corresponds to an interference pattern when the object/scene is illuminated with a monochromatic wavelength.

Fourier transforms for the interference patterns of FIG. 7 and FIG. 8 are shown in FIG. 9 and FIG. 10 respectively. The respective Fourier transforms predict the spectral content of the respective illumination sources. The three peaks in FIG. 9 correspond to the three monochromatic wavelengths in the source used to illuminate the known object/scene. The single peak corresponds to the presence of monochromatic wavelength in the illumination source. Specifically, the spectral signature represents the intensity of reflectance-versus-wavelength relationship for the known object. The spectral signature noted above (which in effect represents a base characteristic of the object) can be stored in memory 175 or be provided to external devices (e.g., storage device on a computing cloud) via communication paths and using circuits not shown.

Spectral signatures of various objects can thus be obtained by the spectrometer, and be used to create a database of base-characteristics of the known objects. As an example (further illustrated below with respect to FIGS. 3, 4 and 5, spectral signatures of good and bad (bruised) apples can be obtained using the spectrometer, and saved in memory 175. The spectral signatures can be then be used to determine presence or absence (or deviation in general) of good/bad apples in hypercube images obtained by using the spectral camera, in a known way.

Operation of spectral imaging system 100 as a spectral camera is described next.

6. Spectral Camera

Processing block 170 processes the six or more responses noted above (outputs of one or both sensors 160A and 160B) to generate a hypercube representing the response of the object/scene at various discrete wavelengths of illumination by a well-established technique which is termed as spectral reconstruction (SR). Memory 175, which may include volatile as well as non-volatile memories, contains instructions for processing block 170 to generate the hypercube. Processing block 170 can display images in the hypercube on display 180.

A brief description of the manner in which processing block 170 generates a spectrally reconstructed image (i.e., the hypercube) from the responses on paths 167A and 167B obtained from the sensor(s) is provided below in sections below.

7. Spectral Reconstruction

Spectral reconstruction is well known in the relevant arts, and for a detailed description, the reader is referred to the document "Color-constancy: a method for recovering surface spectral reflectance", by L. Maloney and B. Wandell, published in J. Opt. Soc. Am—A, v. 3 (1), pp 29-33, 1986.

Spectral reconstruction refers to a technique using which spectral response (hypercube noted above) representing the reflectance of the object/scene at various discrete wavelengths of illumination can be obtained. Assuming a camera having M channels (i.e., M=1 for monochrome and M=3 for an RGB camera), and that N images of the scene have been acquired using "an illumination", the image obtained can be expressed as below:

$$I_{M,N}(x) = \int_{\forall \lambda} c(\lambda, x) p(\lambda, x) s(\lambda, x) d\lambda \quad \text{Equation 1}$$

Wherein, $C_M(\lambda)$ represents the camera response function of the $M^{th}$ channel, $p(\lambda)$ represents the spectral power density of the illumination source, and $s(\lambda)$ represents the reflectance of the object/scene at a given pixel location, and is the parameter to be estimated for each pixel location.

The technique of spectral reconstruction described herein makes the following fundamental assumptions:

a) Illumination that is incident is the same at any given point of the scene b) "Naturally occurring spectra" are smooth c) "Naturally occurring spectra", can be "recovered" (i.e., estimated) from a few basis vectors—Linear regression Model as described in the documents (Maloney 1986, Maloney & Wandell 1986) noted above.

d) "Naturally occurring spectra" are strictly non-negative in nature.

The reflectance s(λ, x) of an object/scene represents the intensity corresponding to wavelength λ at location x, and may be expressed by the following equation:

$s(\lambda, x) = \sum_{i=0}^{K-1} \sigma_i s_i(\lambda)$, where

K=number of basis elements, and $s_i(\lambda) = i^{th}$ basis vector            Equation 2

Vectorizing the above equations provides the following equations:

$i(x) \equiv [I_0(x), I_1(x), \ldots, I_{M-1}(x)]^t = [c_0(\lambda), c_1(\lambda), \ldots, c_{M-1}(\lambda)]^t P(\lambda) S_b(\lambda) \sigma(x)$ $\sigma(x) = [\sigma_0(x), \sigma_1(x), \ldots, \sigma_{K-1}(x)]^t$, are the set of scalars associated with the location at x $S_b = [s_0(\lambda), s_1(\lambda), \ldots, s_{K-1}(\lambda)]$ are the basis vectors On accumulating all locations in the scene, we get the following consolidated equation:

$I = CPS_b \Sigma$            Equation 3

Wherein:
I is a M×R matrix, while Σ is a K×R matrix,
R being the number of points (in this case pixels) in the scene (i.e., image)

On solving equation 3, we obtain the scaling coefficient matrix, which on multiplying with the basis vectors provides the "estimated spectra" at each pixel location in the scene.

$S_{est}(\lambda) = S_b(\lambda) \tilde{\Sigma}$            Equation 4 wherein,
$S_{est}(\lambda)$ represents the estimated spectra, and
$S_b(\lambda)$ represents the basis vectors.
Σtilde represents the scaling coefficient matrix.

Six basis-vectors are sufficient to approximate naturally occurring spectra, and thus six responses under distinct illumination conditions are required to obtain the estimated spectra (hypercube). The six distinct responses under distinct illumination conditions can be the responses provided by sensor(s) of the spectral camera described above. For example, the R, G, B and R', G' and B' responses provided by the color sensor(s) can be used as the 6 basis vectors. Using the techniques noted above, processing block 170 constructs the hypercube from the responses, and may display the corresponding spectrally reconstructed images on display 180. As also noted above, the data obtained from the hypercube can be compared with spectral signatures obtained using the spectrometer to determine presence or absence of one or more features, as illustrated with an example use case below.

The aforementioned process is a liner-regression based method for spectral reconstruction. Variants of this method can be found in the literature, e.g., Matrix-R methods in "Image based spectral reflectance reconstruction using the matrix R method," by Y. Zhao and R. S. Berns, published in Color Research & Application, v. 32, pp. 343-351, 2007, weighted PCA in "Reconstruction of reflectance spectra using weighted principal component analysis", by F. Agahian et al., published in Color Research & Application, v 33 (5), pp. 360-371, 2008, etc. There also exist non-linear variants of special reconstruction which can be applied as described in "Spectral estimation theory: beyond linear but before Bayesian", by J. M. DiCarlo and B. Wandell, published in J. Opt. Soc. Am—A, v. 20 (7), pp. 1261-1270, 2003, and "Link functions and Matern kernel in the estimation of reflectance spectra from RGB responses", by and V. Heikkinen et al., published in J. Opt. Soc. Am—A, v. 30 (11), pp. 2444-2454, 2013.

8. Example Use Case

As an example use case, spectral imaging system 100 can be operated as a spectrometer to obtain spectral signatures representing base characteristic of known good/desirable as well as defective/undesirable apples. Spectral imaging system 100 can then be used as a spectral camera, for instance in an inspection environment in which apples are individually spectrally imaged as they move on a conveyor, to obtain a hypercube of each inspected apple. Portions/spectra in the hypercubes can then be matched with the spectral signatures previously obtained, and the apples can be classified as good or defective in a known way.

Figure 3:
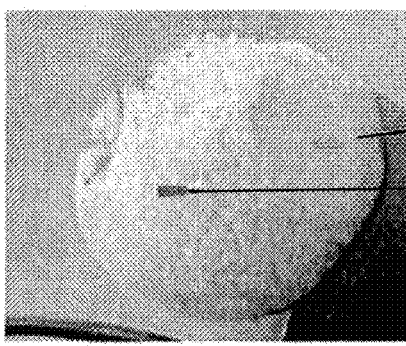
FIG. 3 depicts an RGB image of an apple having a bruised portion, as generally visible to the naked eye, and as captured by a spectral camera in an embodiment of the present disclosure.
Figure 5:
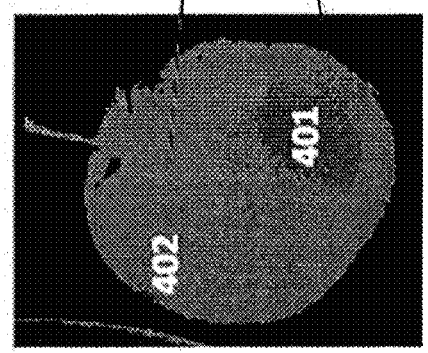
FIG. 5 depicts a slice of a hypercube generated from an image of an apple, in an embodiment of the present disclosure.

FIG. 3 shows an RGB image of an apple as visible to a naked eye and also when captured using an RGB camera, or as captured by the spectral camera of spectral imaging system 100. The apple contains a bruise indicated region 301. The optics sub-system generates six responses from a single illumination of a scene (the apple). The spectral camera then constructs a hypercube of the apple. As noted above, the hypercube contains multiple 'slices' of the same image, but each corresponding to a particular wavelength. One such slice is shown in FIG. 5.

Figure 6:
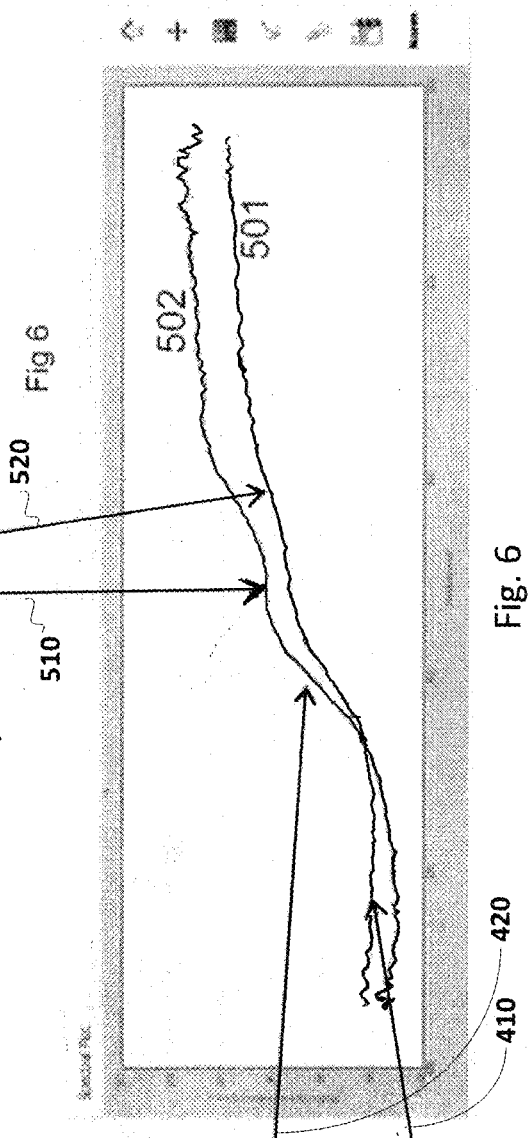
FIG. 6 is a graph depicting the reflectance to wavelength relationship of a good portion and a bruised portion of an apple.

Spectral signatures of the various portions of the apple can be obtained by the spectrometer capability. Thus, for example, the spectrometer generates spectral signatures 501 and 502 (shown in FIG. 6), which is a reflectance versus wavelength graph of a bruised and a non-bruised portion of the apple (as indicated by tails of arrows 510 and 520 respectively). The spectral camera then obtains, for a pixel location, the reflectance values for different wavelengths from the reconstructed hypercube. A similar operation is subsequently performed for all pixels (or pixel locations) in the captured image. Then, the spectral camera compares the reflectance values of each pixel with curve 501 and 502. If the reflectance values of a pixel correlates strongly with curve 501, the camera concludes that the pixel lies in a bruised portion (example pixel indicated by arrow 401). However, if the correlation is strong with curve 502, the camera concludes that the pixel lies in a normal (un-bruised) area of the apple (example pixel indicated by arrow 402). The correlation of reflectance values of each pixel with each of curves 501 and 502 can be performed in a known way. Pixel locations are thus classified as lying either in bruised or non-bruised portions and rendered (spectrally reconstructed) as apple shown in FIG. 4.

Figure 4:
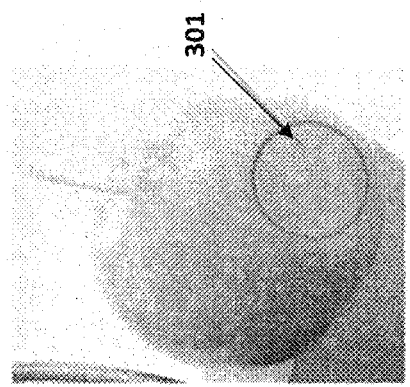
FIG. 4 shows an image of an apple that has been spectrally reconstructed, in an embodiment of the present disclosure.

It may be observed that bruised portions and non-bruised (good) portions are not very distinguishable in the image of FIG. 3, while they are easily distinguishable in the spectrally reconstructed image of FIG. 4. The apple can then be classified as a bad apple.

FIG. 7 is a snapshot of an interference pattern formed by three wavelengths as captured by an interferometer in an embodiment of the present invention. FIG. 9 is the Fourier transform of the interference pattern of FIG. 7. FIG. 8 is a snapshot of an interference pattern formed by a single wavelength as captured by an interferometer in an embodiment of the present invention. FIG. 10 is the Fourier transform of the interference pattern of FIG. 8.

While the above example is described with respect to determining a 'bad apple' which show visual characteristics that deviate from those of desirable apples, it may be appreciated that the base characteristics can be undesirable characteristics as well and the hypercubes can be examined for presence or absence of spectral signatures representing such undesirable characteristics. Similarly, the use case can be extended to various other objects when present in respective captured scenes. Furthermore, spectral imaging system 100 can be used for various other uses also, as will be apparent to a skilled practitioner based on the disclosure provided herein.

While the spectral imaging system of above is described as a single self-contained unit (with corresponding benefits and uses), it may be appreciated that the system can be integrated into consumer devices such as mobile phones also as described below.

9. Normal Camera

In addition to operation as a spectral camera and spectrometer, the spectral imaging system may also be operated as a normal camera, when the optics sub-system is combined with processing block 170, memory 175 and display 180. When used as a normal camera, the generation of the hypercube may not be performed. Instead, the RGB outputs of any one the sensors 160A or 160B may be processed by block 170 to generate a normal image, and render the image on display 180.

Thus, in an embodiment of the present disclosure, the blocks of FIG. 1 (as also those of FIGS. 2A, 2B and 2C) are implemented in a portable form factor including, but not limited to, a smart phone. In such an embodiment, lens 110, collimator 120, and at least one of focusing lenses 160A and 160B can be those available in a normal mobile phone with camera. Beam splitter 130 and prism 140 are added to the mobile phone to enable the phone to operate as a spectral camera. The addition of monochrome sensor 150 and focusing lens 155 further enhances the capability of the mobile phone to operate as a spectrometer.

10. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment. The following examples pertain to above or further embodiments.

Example 1 corresponds to a spectral imaging system that includes an interferometer and an optics sub-system. The interferometer is used to generate an interference pattern from a first light beam emanating from a first scene. The optics sub-system is used to generate six or more responses from a second light beam formed by illumination of a second scene. Each of the six or more response represents a corresponding image of the second scene represented by different spectral content of the second light beam. The second light beam is a single beam formed by a single illumination of the second scene.

Example 2 corresponds to the spectral imaging system of example 1, which further includes a processing block to process the interference pattern to generate a spectral signature of the first scene such that said spectral imaging system operates as a spectrometer. The processing block is designed to also process the six or more responses to generate a hypercube by spectral reconstruction based on the six or more responses such that the spectral imaging system operates as a spectral camera. The hypercube contains multiple values for each pixel of an image representing the second scene. Each pixel value represents the magnitude of reflectance of the portion of the second scene corresponding to the pixel at a corresponding wavelength contained in the single illumination.

Example 3 corresponds to the spectral imaging system of example 1 or example 2, in which the wherein said optic sub-system includes a filter and a set of sensors. The filter is used to alter the intensity of one or more wavelengths from the second light beam. The set of sensors is used to generate six responses from the filtered beam and the beam of light.

Example 4 corresponds to the spectral imaging system of any of examples 1-3, in which the set of sensors includes a first sensor and a second sensor. Each of the first sensor and the second sensor is a RGB (red, green and blue) sensor that generates three signal streams, with the first, second and third signal streams respectively representing only red, green, and blue colors.

Example 5 corresponds to the spectral imaging system of any of examples 1-4, which further includes a memory to store the spectral signature as representing a base characteristic of an object representing the first scene. The processing block compares the spectral signature to characteristics represented by at least some of the plurality of values to determine whether the second scene deviates from the base characteristic.

Example 6 corresponds to the spectral imaging system of any of examples 1-5, which further includes a beam splitter and a prism. The beam splitter is used to split the second beam of light into two beams. The first of the two beams travels towards the first sensor. The prism is used to receive the second of the two beams and to deflect the second beam towards the second sensor.

Example 7 corresponds to the spectral imaging system of any of examples 1-6, which further includes a first focusing lens and a second focusing lens. The first focusing lens is disposed between the beam splitter and the first sensor to focus the first beam in a first direction on to the first sensor. The second focusing lens is disposed between the prism and the second sensor to focus the deflected second beam in a second direction on to the second sensor. The first direction is parallel to the second direction. The first sensor and the second sensor are juxtaposed along a same plane.

Example 8 corresponds to the spectral imaging system of any of examples 1-7, in which the beam splitter is in the form of a cube containing a diagonal partially reflecting plane. The partially reflecting plane causes a part of the beam of light to be reflected towards the prism in a third direction. A pair of surfaces in the beam splitter and the prism are designed to be partially reflecting surfaces to reflect at least respective portions of both of the first beam and the second beam. The respective portions are processed by the spectrometer to generate the spectral signature. The other surfaces of the beam splitter and the prism are non-reflecting surfaces.

Example 9 corresponds to the spectral imaging system of any of examples 1-8, wherein the interferometer includes a monochrome sensor and a third focusing lens. The interferometer is used to capture an interference pattern generated by respective portions of the first beam and the second beam. The processor is used to process the interference pattern to generate the spectral signature. The third focusing lens is disposed between the beam splitter and the monochrome sensor to focus the respective portions of the first beam and the second beam onto the monochrome sensor.

Example 10 corresponds to the spectral imaging system of any of examples 1-9, in which the interferometer and the optics sub-system use at least one common optic component.

Example 11 corresponds to the spectral imaging system of any of examples 1-10, in which the spectrometer and the spectral camera are integrated into a mobile phone or a portable form factor.

Example 12 corresponds to a spectral camera system that includes an optics sub-system and a set of sensors. The optics sub-system is used to form multiple beams of light from a single beam received by illumination of a scene. The single beam and the multiple beams represent the scene. Each of the multiple beams contains different spectral content. Each sensor in the set of sensors is used to receive a corresponding one of the multiple beams and to generate a set of responses. Each response is a respective image of the scene in only a corresponding band of wavelengths.

Example 13 corresponds to the spectral camera system of example 12, in which the plurality of beams are parallel to each other. The spectral camera further includes a processor to generate a hypercube by spectral reconstruction based on the sets of responses. The hypercube contains multiple intensity values captured by each pixel of an image sensor representing the scene, wherein each value corresponds to a wavelength present in the illumination.

Example 14 corresponds to the spectral camera system of example 12 or example 13, wherein the set of sensors contains two color sensors, each containing an RGB sensor such that the processor processes six responses formed by the two sensors together. The six responses are contained in the set of responses.

Example 15 corresponds to the spectral camera system of example 13, in which the plurality of beams correspond to two beams having same spectral content. The optics sub-system includes a beam splitter and a prism to form the two beams from a single beam, a filter to alter the intensity of one or more wavelengths in one of the two beams to generate a filtered beam, and a pair of focusing lenses to focus the filtered beam and the other one of the two beams on respective ones of the set of sensors.

Example 16 corresponds to the spectral camera of example 12, in which a first beam of the plurality of beams is orthogonal to a second beam of the plurality of beams.

While various embodiments of the present invention have been described above, it should be understood that they have been presented by way of example only, and not limitation. Thus, the breadth and scope of the present invention should not be limited by any of the above-described embodiments.

What is claimed is:

1. An imaging system comprising:
   an interferometer to generate an interference pattern from a first light beam emanating from a first scene; and
   an optics sub-system to generate six or more responses from a second light beam formed by illumination of a second scene, wherein each of said six or more responses is a corresponding image of said second scene represented by different spectral content of said second light beam,
   wherein said second light beam is a single beam formed by one illumination of said second scene,
   wherein each response contains a respective magnitude of reflectance at a corresponding distinct wavelength band for each pixel representing said second scene,
   wherein all of said six or more responses represent a same spatial area of said second scene.

2. The imaging system of claim 1, further comprising a processing block to process said interference pattern to generate a spectral signature of said first scene such that said spectral imaging system operates as a spectrometer, said processing block to also process said reflectance magnitudes in said six or more responses to generate a hypercube by spectral reconstruction based on said six or more responses such that said spectral imaging system operates as a spectral camera,
   wherein said hypercube contains, a plurality of values for each pixel of an image representing said second scene, wherein each value represents the magnitude of reflectance of the portion of the second scene corresponding to the pixel at a corresponding wavelength contained in said single illumination.

3. The imaging system of claim 2, wherein said optic sub-system comprises:
   a filter to alter the intensity of one or more wavelengths from said second light beam to generate a filtered beam; and
   a set of sensors to generate six responses from said filtered beam and said second light beam,
   wherein some of said six responses are generated from said filtered beam, the rest of the six responses being generated from the second light beam.

4. The imaging system of claim 3, wherein said set of sensors comprise a first sensor and a second sensor,
   wherein each of said first sensor and said second sensor is a RGB (red, green and blue) sensor that generates three signal streams, with the first, second and third signal streams respectively representing only red, green, and blue colors.

5. The imaging system of claim 4, further comprising:
   a memory to store said spectral signature as representing a base characteristic of an object representing said first scene; and
   wherein said processing block compares said spectral signature to characteristics represented by at least some of said plurality of values to determine whether said second scene deviates from said base characteristic.

6. The imaging system of claim 3, further comprising:
   a beam splitter to split said second light beam from said scene into two beams, wherein a first beam of said two beams travels towards said first sensor; and
   a prism to receive a second beam of said two beams and to deflect said second beam towards said second sensor.

7. The imaging system of claim 6, further comprising:
   a first focusing lens disposed between said beam splitter and said first sensor to focus said first beam in a first direction on to said first sensor; and
   a second focusing lens disposed between said prism and said second sensor to focus said deflected second beam in a second direction on to said second sensor,
   wherein said first direction is parallel to said second direction,
   wherein said first sensor and said second sensor are juxtaposed along a same plane.

8. The imaging system of 7, wherein said beam splitter is in the form of a cube, said cube containing a diagonal partially-reflecting plane to cause part of said beam of light to be reflected towards said prism in a third direction, wherein a pair of surfaces in the combination of said beam splitter and said prism are designed
   to be partially reflecting surfaces to reflect at least respective portions of both of said first beam and said second beam,
   wherein said respective portions are processed by said spectrometer to generate said spectral signature,
   wherein other surfaces in said combination are designed not to be reflective surfaces.

9. The imaging system of claim 8, wherein said interferometer comprises:
a monochrome sensor to capture an interference pattern generated by said respective portions, wherein said processor processes said interference pattern to generate said spectral signature; and
a third focusing lens disposed between said beam splitter and said monochrome sensor to focus said respective portions onto said monochrome sensor.

10. The imaging system of claim 1, wherein said interferometer and said optics sub-system are implemented using at least one common optic component.

11. The imaging system of claim 1, wherein said spectrometer and said spectral camera are integrated into a mobile phone or a portable form factor.

12. A spectral camera system comprising:
an optics sub-system to form a plurality of beams of light from a single beam received by a single illumination of a scene, wherein each of said single beam and said plurality of beams represent said scene, wherein each of said plurality of beams contain different spectral content; and
a set of sensors, each sensor to receive a corresponding one of said plurality of beams and to generate a corresponding set of responses, said sets of responses together comprising six or more responses, wherein each response is a respective image of said scene in only a corresponding band of wavelengths, wherein each band of wavelengths is constituted of a plurality of wavelengths which are contiguous,
wherein each response contains a respective magnitude of reflectance at the corresponding band of wavelengths for each pixel representing said scene,
wherein all of said six or more responses represent a same spatial area of said scene.

13. The spectral camera system of claim 12, wherein said plurality of beams are parallel to each other, said spectral camera system further comprising a processor to generate a hypercube by spectral reconstruction based on said six or more responses,
wherein said hypercube contains a plurality of intensity values captured by each pixel of an image sensor representing said scene, wherein each value corresponds to a wavelength present in the illumination.

14. The spectral camera system of claim 13, wherein said set of sensors comprise two color sensors, each of said color sensor comprises an RGB sensor a first color sensor of said two color sensors generates a first set of three responses of band of wavelengths corresponding red (R), green (G) and blue (B) colors, and a second color sensor of said two color sensors generating a second set of three responses of band of wavelengths corresponding red (R'), green (G') and blue (B') colors, such that the six responses are in band of wavelengths corresponding to R, G, B, R', G', B' colors respectively,
wherein said processor processes said six responses formed by said two sensors together, said six responses being contained in said sets of responses.

15. The spectral camera system of claim 13, wherein said plurality of parallel beams contain two beams having same spectral content, wherein said optics sub-system comprises:
a beam splitter and a prism to form said two beams from said single beam;
a filter to alter the intensity of one or more wavelengths in one of said two beams to generate a filtered beam; and
a pair of focusing lenses to focus said filtered beam and the other one of said two beams on respective ones of said set of sensors.

16. The spectral camera system of claim 12, wherein a first beam of said plurality of beams is orthogonal to a second beam of said plurality of beams.

17. An imaging system comprising:
a processor;
a memory;
an interferometer to generate an interference pattern from a first light beam emanating from a first scene; and
an optics sub-system to generate six or more responses from a second light beam formed by a single illumination of a second scene, wherein each of said six or more responses is a corresponding image of said second scene represented by different spectral content of said second light beam,
wherein each response contains a respective magnitude of reflectance at a corresponding distinct wavelength band for each pixel representing said second scene,
wherein all of said six or more responses represent a same spatial area of said second scene
wherein said processing block is operable to process said interference pattern to generate a spectral signature of said first scene, said processing block operable to store, in said memory, said spectral signature as representing a base characteristic of an object representing said first scene,
wherein said processing block is operable to process said reflectance magnitudes in said six or more responses to generate a hypercube, said hypercube containing a plurality of values for each pixel of an image representing said second scene, wherein each value represents the magnitude of reflectance of the portion of the second scene corresponding to the pixel at a corresponding wavelength contained in said single illumination,
wherein said processing block compares said spectral signature to characteristics represented by at least some of said plurality of values to determine whether said second scene deviates from said base characteristic.

18. The imaging system of claim 17, wherein said optic sub-system comprises:
a filter to alter the intensity of one or more wavelengths from said second light beam to generate a filtered beam;
a set of sensors to generate six responses from said filtered beam and said second light beam.

19. The imaging system of claim 18, wherein said set of sensors comprise a first sensor and a second sensor,
wherein each of said first sensor and said second sensor is a RGB (red, green and blue) sensor that generates three signal streams, with the first, second and third signal streams respectively representing only red, green, and blue colors.

20. The imaging system of claim 19, wherein said optics sub-system further comprises:
a beam splitter to split said second light beam from said second scene into two beams, wherein a first beam of said two beams travels towards said first sensor; and
a prism to receive a second beam of said two beams and to deflect said second beam towards said second sensor.

* * * * *